INTERLOCKED AUTOMATIC SEQUENTIAL FIRING UNIT

Filed June 30. 1961

INVENTOR
RAYMOND G. LINS
BY Herbert F. Somermeyer
ATTORNEY

United States Patent Office
3,177,844
Patented Apr. 13, 1965

3,177,844

INTERLOCKED AUTOMATIC SEQUENTIAL FIRING UNIT

Raymond G. Lins, Minneapolis, Minn., assignor to Sperry Rand Corporation, New York, N.Y., a corporation of Delaware Filed June 30, 1961, Ser. No. 121,134
4 Claims. (Cl. 118—5)

This invention relates generally to control apparatus for use in depositing thin ferromagnetic film by the process of explosive evaporation.

The process of vapor deposition of thin ferromagnetic films is described in the Rubens Patent 2,900,282. An improved method of vapor depositing thin films is by exploding a wire in vacuo. In the improved method a wire consisting of the metal to be deposited is firmly held between two electrodes in a vacuum bell jar. A bank of electrical capacitors are charged to a predetermined voltage. At a given time the capacitors are discharged through the wire causing the wire to change from the solid to the vapor state, thereby depositing the metal on a substrate which is suitably disposed with respect to the wire. This method has several advantages in that it provides a short deposition time to reduce the interaction between the metalized vapor and the residual gases in the vacuum as well as preventing fractional distillation of alloys. Improved explosive evaporation is found by causing the wire to be heated to a predetermined temperature prior to explosion. A critical time occurs between the time the preheat stops and the capacitors are discharged through the wire for exploding it. It has been found that variations in this time will cause a variation in the properties of the film being deposited on the suitable substrate. However, when properly performed extremely homogenous films are produced.

Accordingly, it is an object of this invention to provide a control apparatus for accurately and consistently explosively evaporating a wire onto a substrate.

It is another object of this invention to provide a control apparatus for thin film deposition which accurately controls the delay between the preheat cycle and the explosion cycle.

It is still another object of this invention to provide a wire exploding apparatus which is fail safe.

Still more detailed and specific objects will be disclosed in the course of the following specification and drawing wherein.

Figures 1, 2:
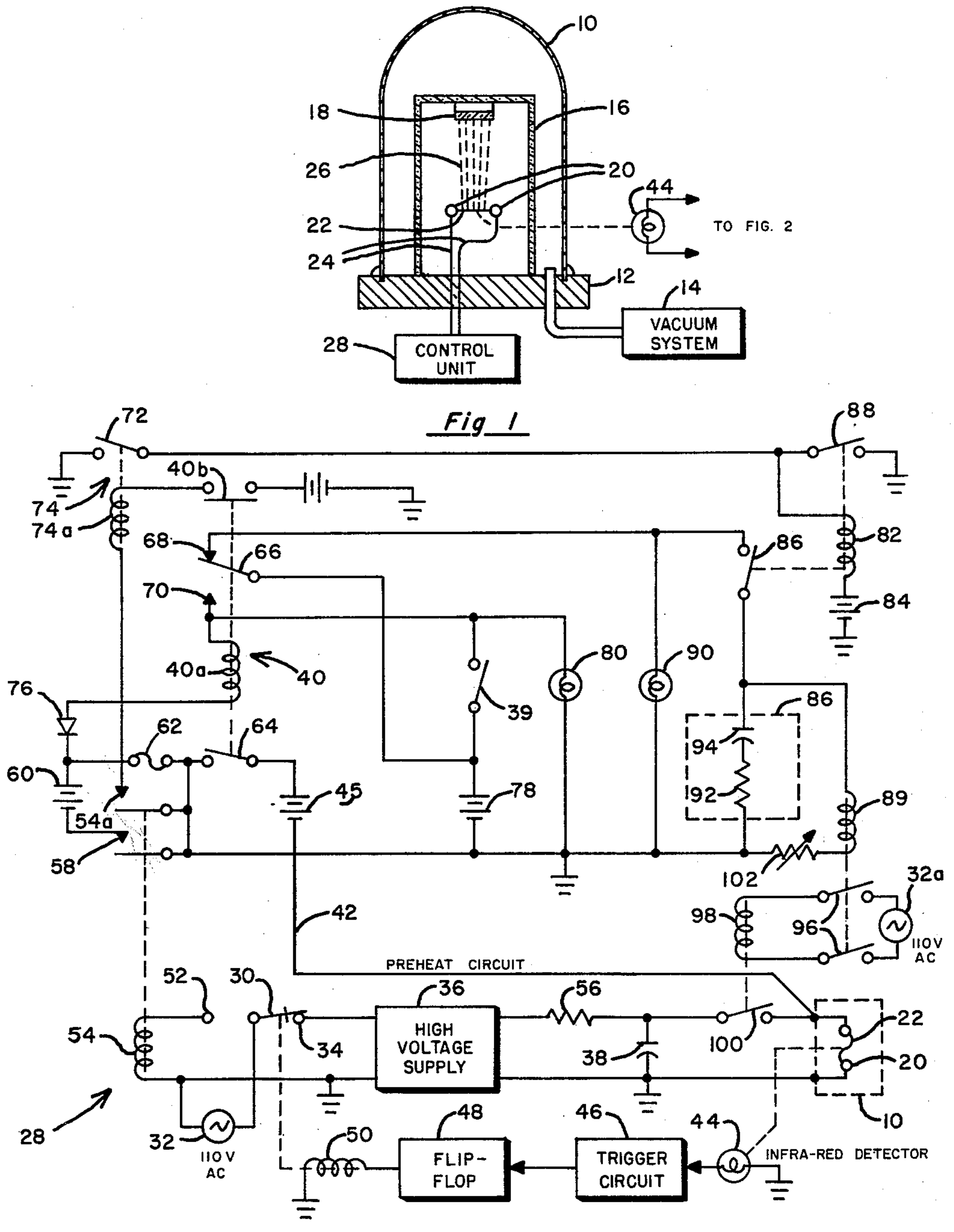
FIG. 1 is a schematic showing of a vapor deposition apparatus incorporating the subject invention.
FIG. 2 is a schematic drawing of the exemplary embodiment of the subject invention.

Referring now to FIG. 1 there is shown a bell jar 10 mounted on a suitable base 12 and connected to a vacuum system 14. Inside the jar 10 there is provided a holder 16 holding a substrate 18 on which a film is to be deposited. A pair of electrodes 20 hold the wire filament 22 to be exploded inside the jar and immediately below the substrate 18. The lead-in wires 24 are disposed and arranged with respect to the wire 22 such that when the wire is vaporized the vapors are directed along the path 26 onto the substrate 18. The purpose of this is to prevent the vapor from being deposited on the holder 16 and on inside the bell jar 10. The control unit 28 contains the circuitry shown in FIG. 2.

As shown in FIG. 2, the switch 30 initially connects the 110 volt A.C. conventional power source 32 to terminal 34 for energizing the high voltage supply 36 to charge the electrical capacitor 38 which provides the electrical energy for exploding the wire 22. To initiate the automatic exploding of the wire, the single-pole manually-actuated switch 39 is momentarily closed completing a circuit to energize the control relay 40 for causing a preheat circuit 42 to be completed. This circuit includes the battery 45 and the normally-open switch part 64 for heating the wire 22 to a predetermined temperature. A hold circuit is provided through diode 76, element 62, battery 78, switch part 66, 70 and the coil 40*a*. The indicator 80 glows when the relay 40 is energized.

An infra-red temperature sensor 44 is focused on the wire filament 22 for detecting the temperature thereof. When the wire filament 22 has reached a predetermined temperature, preferably just below the melting temperature of the wire, the temperature sensor 44 causes the trigger circuit 46 to emit a single pulse for setting the flip-flop 48. Flip-flop 48 in turn energizes the coil 50 for moving the switch arm 30 from the terminal 34 to the terminal 52 for supplying the 110 volt current to the coil 54. The timing considerations are adjusted such that the heating of the wire 22 will not be completed before the high voltage supply 36 is able to fully charge the capacitor 38 through the surge resistor 56.

The relay coil 54 upon being energized closes the switch part 58 which places the battery 60 directly across the fusible element 62 for causing same to open for breaking the holding circuit of the relay 40. It should be noted that this causes the switch 64 to open thereby breaking the preheat circuit 42. Also the fuse 62 is included in the hold circuit for the relay 40 which includes the diode 76 for making the current through the relay 40 unidirectional and the battery 78, contact 70 and the arm 66. The batteries 45 and 60 act in opposition to the battery 78 and are effectively not a part of the hold circuit. The indicator bulb 80 which was lit when the relay 40 was energized is now extinguished. Simultaneously therewith the bipolar switch part arm 66 is moved from the contact 70 to the contact 68 and the switch 72 is closed through the intermediate relay 74. The relay coil 74*a* is serially connected between the normally-closed switch part 40*b* and the normally-open switch part 54*a* such that the relay 74 is energized only when the relay 40 is deenergized after the relay 54 is activated.

Switch part 72 when closed completes a circuit through the coil 82 and battery 84 for closing the switches 86 and 88. The switch 88 completes a hold circuit for coil 82 while the switch 86 completes an electrical circuit from the contact 68 of relay 40 and battery 78 through the timing means 86 for controlling the energization of the explosion-control relay 89. The indicator bulb 90 is used to provide a visual indication that the timing element 86 is ready to energize the relay 89 just prior to exploding the wire 22.

The means 86 consist of a series connected resistor 92 and a capacitor 94 which is charged to provide a voltage thereacross sufficient to cause the relay 89 to close the switch 96 which permits the power source 32*a* to energize the relay 98 for closing the oil-bath type switch-part 100. As soon as switch part 100 is closed, the capacitor 38 is immediately discharged through the wire 22, causing same to explode and direct its vapor along the path 26 onto the substrate 18 as shown in FIG. 1.

The means 86 in cooperation with the above described relay circuits provides a fixed timing delay between the breaking of the preheat circuit 42 and the discharge of the capacitor 38 through the wire 22. It is important to the operation of the deposition process that this time delay be accurate and consistent for providing homogeneous ferromagnetic films. To further enhance the operation of this circuit, a variable resistor 102 is provided in series circuit with the relay 89 for adjusting the timing delay. It is appreciated that other adjustment means may be provided with equal facility. This adjustment permits a closer control of the film properties.

The embodiment illustrated provides a fully automatic timing mechanism for controlling the explosive-type of vapor depositing film process. The sensing and control means 44, 46, 48, and 50 for automatically moving the switch 30 from terminal 34 to 52 may be manually-actuated. For example, an optical pyrometer may be focused on the wire filament 22 with an operator making note of the wire temperature. When the wire has reached the predetermined temperature and the capacitor 38 has been fully charged, the switch 30 may be manually-actuated to the terminal 52. While this method of operation has produced satisfactory films, the fully automatic version is preferred because of more constant operation provided by the elimination of human error and judgment.

Upon completion of a deposition cycle, the switch 30 is manually returned from the terminal 52 to the terminal 34 for the next explosion and the flip-flop 48 is reset as is well known in the art. The apparatus is now in condition to control a second explosive evaporation.

In some vapor deposition process it is desirable to provide a preheat cycle which includes heating the filament 22 above a predetermined temperature, stop preheating and permit the filament to cool before exploding the filament. The timing delay provided by this invention permits this in that the temperature sensor can be set to be responsive to such higher temperature with the delay being accurately adjusted to permit the right degree of cooling when the wire is exploded. It has been found this provides a somewhat more uniform result.

From the foregoing description it can be seen that the control system is "fail safe"; that is if a component fails such that an adverse effect could be produced by the wire exploding, then the explosion is prevented by such failure causing inoperativeness.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. In a system for vapor-depositing homogeneous films by exploding a filament consisting of material to be deposited and having a high voltage storage means and a preheat circuit, the improvement comprising manually actuated means connected to said circuit and storage means for simultaneously actuating the circuit and storage means, sensing means in operative relationship to said filament for sensing the temperature thereof and coupled to said manually actuated means for breaking the preheat circuit when a predetermined temperature in the filament is sensed, high voltage connection means for selectively connecting the storage means to said filament for exploding same, and automatic timing means connected to the connection means and being responsive to the breaking of said preheat circuit for actuating the connection means after a predetermined time delay.

2. Apparatus as in claim 1 wherein the automatic timing means are adjustable for varying the properties of the deposited films by varying the time delay between the preheat circuit opening and exploding the filament.

3. In a system for vapor-depositing homogeneous films by exploding a filament consisting of material to be deposited and having a high voltage storage means and a preheat circuit and a relay control switch for connecting the storage means to said filament, power source means connected to the storage means for causing same to produce a high voltage, manually actuated timing control means operatively associated with the preheat circuit for causing same to be completed such that the filament receives a current for raising the temperature thereof, sensing means responsively associated with the filament for detecting a predetermined temperature, control means responsive to the sensing means detecting said temperature and connected to the source means for causing it to be disconnected from said storage means, a first relay connected to said manually source means and having a pair of normally open contacts, a battery and a fusible element in series circuit relationship with said contacts, the fusible element being in series circuit relationship to said timing control means such that when the first relay contacts close the fusible element opens to deenergize the timing means which opens the preheat circuit, and timing means connected and being responsive to the timing control means and being operatively connected to the relay control switch for closing same to cause said filament to be exploded by passing current from the storage means therethrough.

4. In a fail safe system for vapor-depositing homogeneous films by exploding a filament consisting of material to be deposited and having a high voltage storage means for simultaneously actuating the circuit and storage means, a first control relay having two normally open switch parts and one bipolar switch part, a first battery connected to a first one of said normally open switch parts and being in series circuit relationship with the filament, a second battery, a fusible element, a manual switch for connecting the first relay, first battery and the fusible element in series, a second battery, a second relay, temperature sensing and control means directed at the filament for detecting the temperature thereof and being associated with the second relay for actuating same when a predetermined temperature is reached, the second relay when actuated being operative to connect the second battery and the fusible element in series for opening the element to cause the element to provide an open circuit for the first control relay thereby opening the preheat circuit, time delay means connected to said bipolar switch part and to the second one of said normally open switch parts and being responsive thereto for connecting the storage means to the filament to cause a high current surge therethrough a predetermined time after the preheat circuit has opened.

References Cited by the Examiner

UNITED STATES PATENTS

| | | | |
|---|---|---|---|
| 2,658,141 | 11/53 | Kurland et al. | 315—157 X |
| 3,012,126 | 12/61 | Ferguson | 328—3 X |

FOREIGN PATENTS

| | | |
|---|---|---|
| 702,937 | 2/41 | Germany. |

RICHARD D. NEVIUS, *Primary Examiner.*